United States Patent [19]

Conrad

[11] 4,038,881
[45] Aug. 2, 1977

[54] MOTION TRANSMITTING REMOTE CONTROL ASSEMBLY

[75] Inventor: Winthrop B. Conrad, Rosemont, Pa.

[73] Assignee: Teleflex Incorporated, North Wales, Pa.

[21] Appl. No.: 359,320

[22] Filed: May 11, 1973

[51] Int. Cl.² ............................ F16C 1/10; F16H1/04
[52] U.S. Cl. ................................... 74/501 P; 74/422
[58] Field of Search ............... 74/501 P, 74/501 R, 502, 480 B, 422; 49/404

[56] References Cited

U.S. PATENT DOCUMENTS

| 1,846,070 | 2/1932 | Schweitzer | 74/502 X |
|---|---|---|---|
| 1,983,962 | 12/1934 | Barber et al. | 74/422 X |
| 2,228,267 | 1/1941 | Haggerty | 74/422 |
| 2,438,380 | 3/1948 | Arens | 74/502 X |
| 3,015,969 | 1/1962 | Bratz | 74/501 P |
| 3,063,303 | 11/1962 | Cadwallader | 74/480 B |
| 3,263,948 | 8/1966 | Conrad | 74/501 P X |
| 3,274,846 | 9/1966 | Forster | 74/422 |
| 3,342,081 | 9/1967 | Conrad | 74/501 P |
| 3,369,426 | 2/1968 | Matz, Jr. | 74/501 P |
| 3,398,600 | 8/1968 | White et al. | 74/502 |
| 3,418,755 | 12/1968 | Chiaro | 49/404 |
| 3,429,197 | 2/1969 | Loewenstern | 74/502 |
| 3,439,555 | 4/1969 | Rech | 74/501 |
| 3,487,709 | 1/1970 | Zieber, Jr. | 74/422 |
| 3,572,159 | 3/1971 | Tschanz | 74/501 P |
| 3,764,779 | 10/1973 | Kadoya et al. | 74/501 P X |

FOREIGN PATENT DOCUMENTS 949,168   4/1949   France ........................ 74/422

Primary Examiner—Samuel Scott
Assistant Examiner—Lance W. Chandler
Attorney, Agent, or Firm—McGlynn and Milton

[57] ABSTRACT

A motion transmitting remote control assembly including an elongated flexible motion transmitting element comprising a multi-stranded wire core and a wire helically coiled about the core. A terminal means of organic polymeric material is molded about the core element to encase the coiled wire and the core in the areas between adjacent convolutions of the coiled wire. In one embodiment, a terminal means is slideably disposed in a slideway of a guide member which also includes a channel to guide the sliding movement of a movable window member and the terminal means has an attachment portion extending through a passageway from the slideway to the channel for attachment to the window. In another embodiment, the terminal means is molded about the core element and extends radially a distance no greater than the radial extremities of the coiled wire and is slideably disposed within and extends from the end of a guide conduit whereby the motion transmitting element will not bend along the terminal means when subjected to compression forces. In a third embodiment, the terminal means takes a specific form particularly adapted for utilization in a sliding sun roof assembly in an automobile.

8 Claims, 9 Drawing Figures

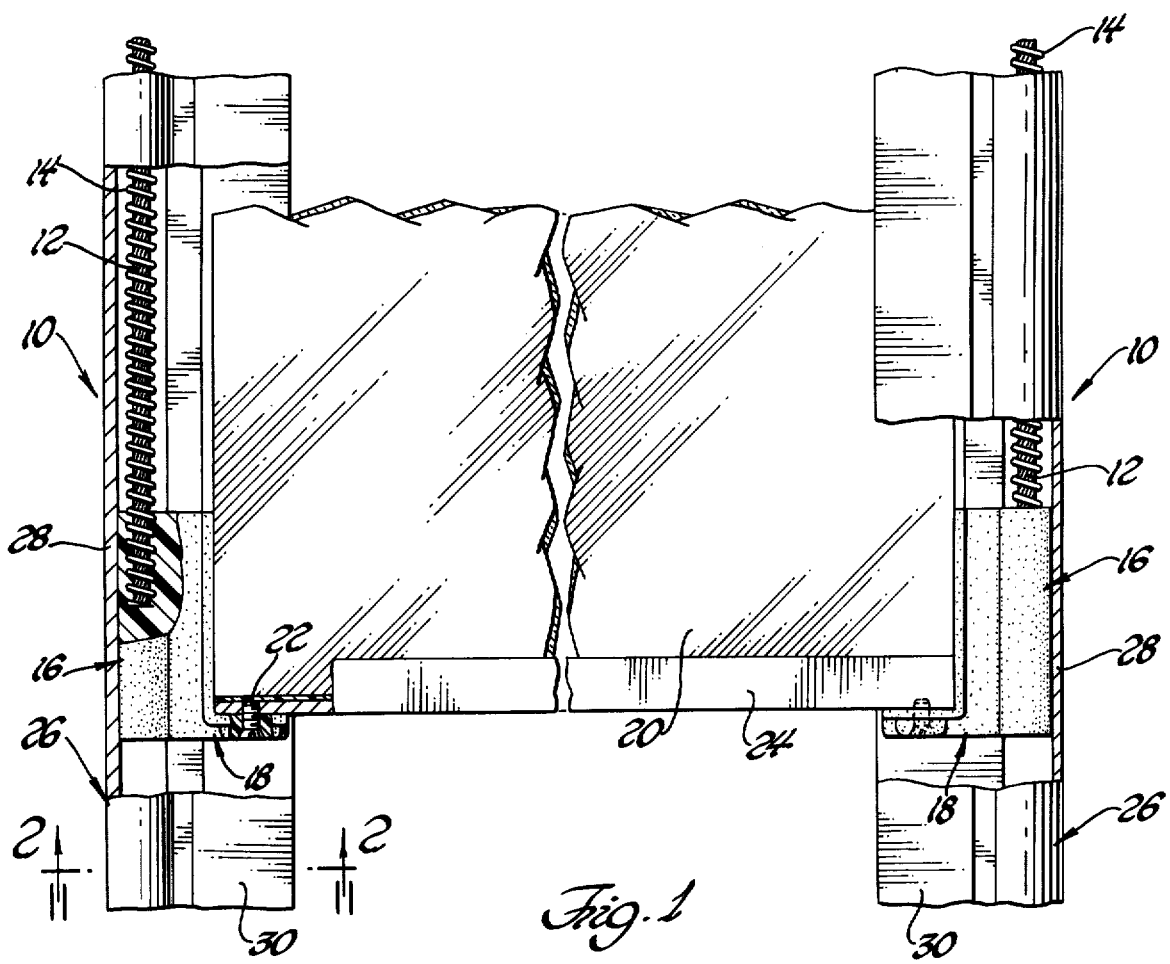
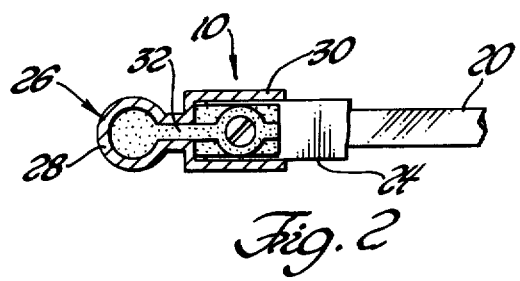
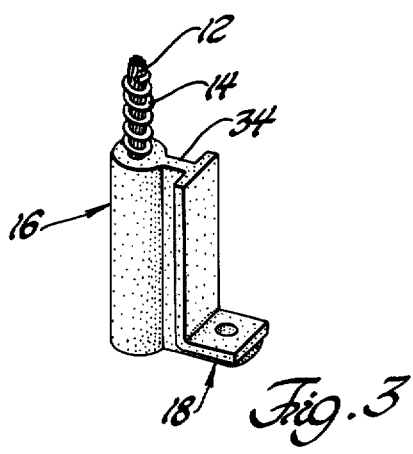 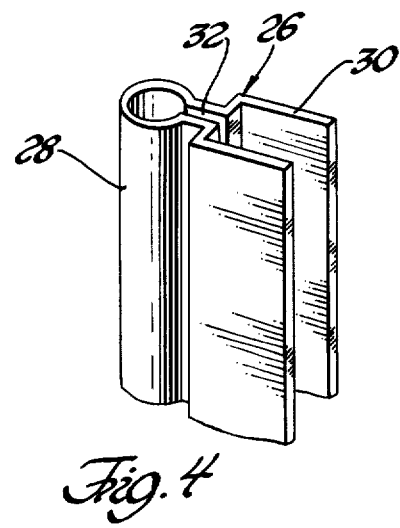

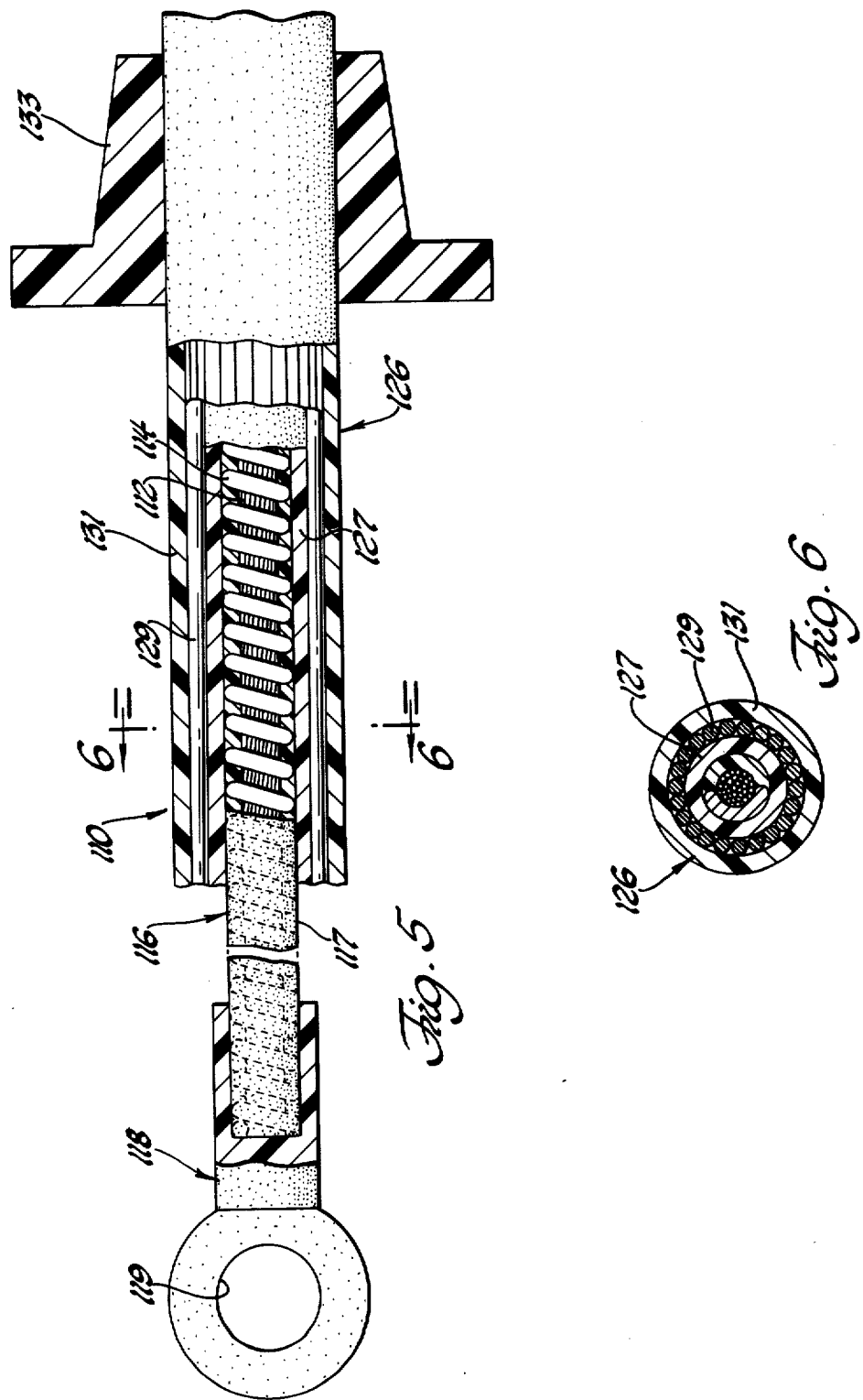

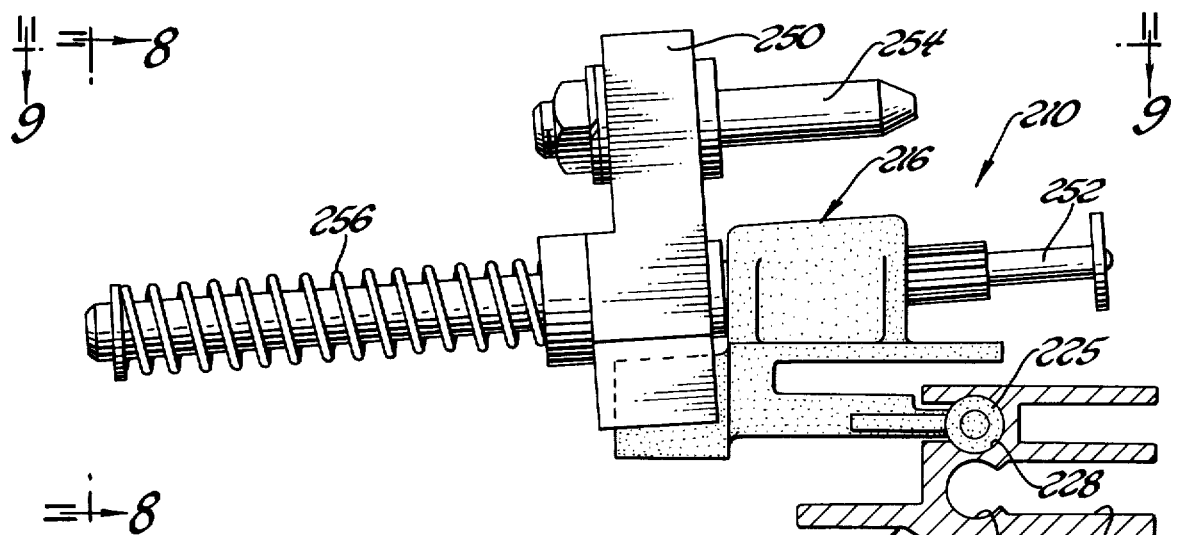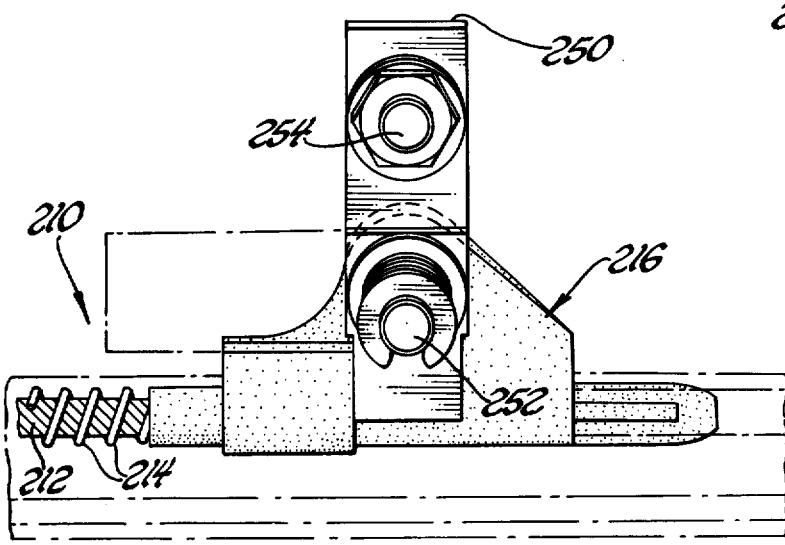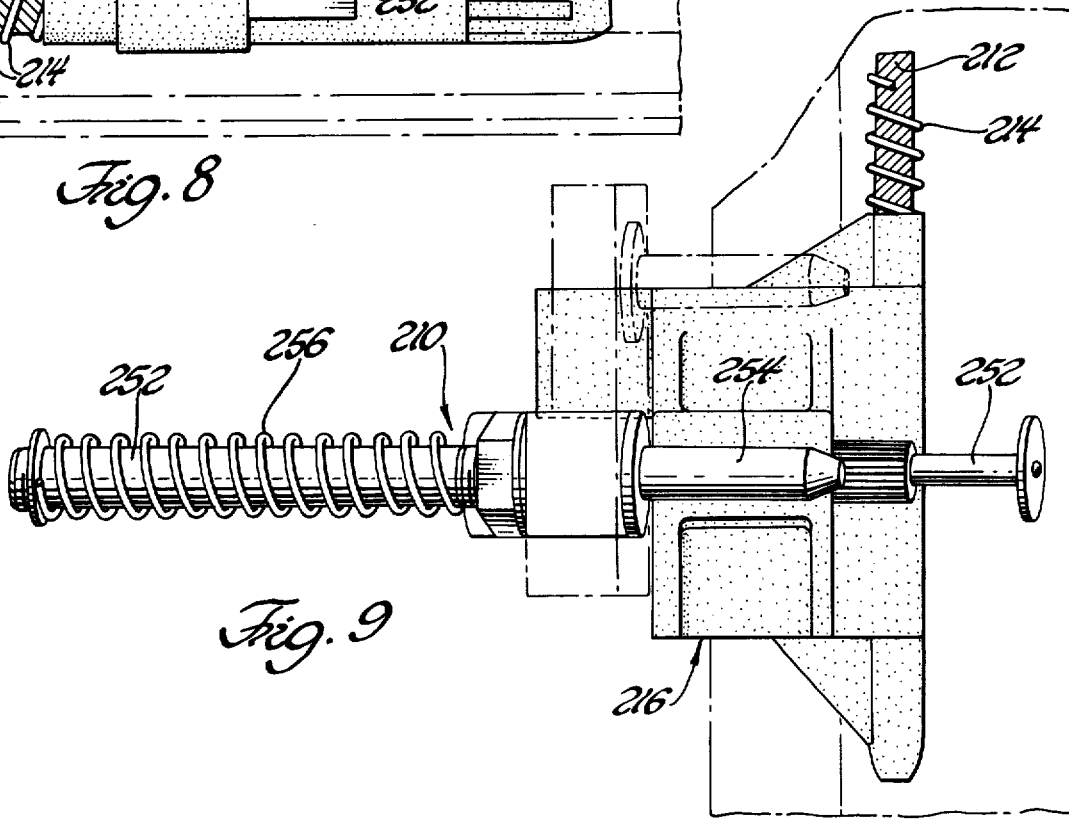

MOTION TRANSMITTING REMOTE CONTROL ASSEMBLY

The subject invention relates to a motion transmitting remote control assembly of the type for transmitting tension or compression forces in a curved path by a flexible motion transmitting element. More specifically, the subject invention relates to such an assembly including a flexible motion transmitting element comprising a multi-stranded wire core with a helically coiled wire disposed about the core in spaced convolutions.

Typically in the past, a metal terminal means has been secured to such a motion transmitting element by removing the coiled wire along a portion of the length of the core and disposing a metal member in frictional gripping relationship with the multi-stranded core. In accordance with the subject invention a terminal means of organic polymeric or plastic material is disposed about the motion transmitting element to encase the coiled wire and the core element in the areas between adjacent convolutions of the coiled wire. The force required to separate such a terminal means from the motion transmitting element is up to twice that required to separate the prior art metal terminal means disposed about the multi-stranded core. Furthermore, the use of polymeric organic materials in the terminal means eliminates the requirement for additional inserts utilized with the metal terminals to reduce friction between the terminal means and the metal guide in which the metal terminal moves.

Accordingly, it is an object and feature of this invention to provide a motion transmitting control assembly comprising an elongated flexible motion transmitting element including a core and a helically coiled wire disposed about the core in spaced convolutions with terminal means of organic polymeric material disposed about the core element to encase the coiled wire and the core in the areas between adjacent convolutions of the coiled wire.

Other objects and attendant advantages of the instant invention will be readily appreciated as the same becomes better understood by reference to the following detailed description when considered in connection with the accompanying drawing wherein:

FIG. 1 is an elevational view partially broken away and in cross-section of a first preferred embodiment of the subject invention utilized in a sliding window assembly;

FIG. 2 is a cross-sectional view taken substantially along line 2—2 of FIG. 1;

FIG. 3 is a perspective view of the terminal means utilized in the assembly of FIG. 1;

FIG. 4 is a perspective view of the guide utilized in the assembly of FIG. 1;

FIG. 5 is an elevational view partially broken away and in cross-section of a second embodiment of the subject invention shown in an environment where the terminal means is slidably disposed within and extends from a guide conduit;

FIG. 6 is a cross-sectional view taken substantially along line 6—6 of FIG. 5;

FIG. 7 is an elevational view partially in cross-section and showing another embodiment of the subject invention utilized in a sliding sun roof assembly;

FIG. 8 is a view taken substantially along line 8—8 of FIG. 7; and

FIG. 9 is a view taken substantially along line 9—9 of FIG. 7.

Turning first to the embodiment shown in FIGS. 1 through 4, a motion transmitting remote control assembly constructed in accordance with the instant invention is generally shown at 10.

The remote control assembly 10 comprises an elongated flexible motion transmitting element which includes a core 12 made up of a plurality of individual wire strands helically wound together on a long lead. The motion transmitting element also includes a helically coiled wire 14 which is disposed about the core 12 in spaced convolutions. The helically coiled wire normally engages a gear wheel of the type disclosed in U.S. Pat. No. 3,429,700 to be driven by or to rotate the gear wheel. An example of such a driving connection is shown in U.S. Pat. No. 3,487,709.

The assembly 10 also includes a terminal means, generally indicated at 16, of organic polymeric or plastic material. The terminal means 16 is molded so as to be disposed about the motion transmitting element to encase the coiled wire 14 and the core 12 in the areas between adjacent convolutions of the coiled wire 14.

The terminal means 16 includes an attachment portion generally indicated at 18 adapted for connection to a movable member such as the window 20. More specifically, the attachment means includes a flange which is bolted or fastened by the threaded fasteners 22 to a support member 24 which, in turn, supports the window 20.

The assembly 10 also includes a guide generally indicated at 26 for the terminal means 16 to slide along. More specifically, the guide 26 includes an elongated slideway 28 for guiding the sliding movement of the terminal means 16 while retaining the terminal means 16 therein. The guide 26 also includes a channel 30 for guiding sliding movement of the movable window member 20, the side edges of which are slidably disposed within the channel 30. The guide 26 also includes a passage 32 extending between the slideway 28 and the channel 30. The attachment portion 18 includes a section 34 extending through the passageway 32 and into the channel 30 for attachment to the movable window member 20.

As illustrated, the slideway 28 is circular in cross-section and the channel 30 is generally U-shaped in cross-section to receive the edge portions of the window 30.

The assembly illustrated in FIG. 1, of course, utilizes two motion transmitting remote control assemblies constructed in accordance with the instant invention for vertically moving the window 20.

Turning now to the embodiment of FIGS. 5 and 6, there is disclosed a motion transmitting remote control assembly generally shown at 110. The assembly 110 includes an elongated flexible motion transmitting element including a multi-stranded wire core 112 and a helically coiled wire 114 disposed about the core 112 in spaced convolutions, i.e., the same as that previously described in connection with the assembly of FIG. 1.

The assembly 110 also includes a terminal means generally indicated at 116 and made of organic polymeric or plastic material. The terminal means is molded so as to be disposed about the motion transmitting element to encase the coiled wire 114 and the core 112 in the areas between adjacent convolutions of the coiled wire 114.

The terminal means 116 also includes an attachment portion, generally indicated at 118, adapted for connection to a movable member. The attachment portion 118 has a hole 119 for receiving a movable member.

The assembly 110 also includes a guide for the terminal means 116, which guide comprises a flexible conduit 126. The conduit 126 may take various forms but as illustrated includes an inner tubular member 127 surrounded by a plurality of wires 129 helically wound about the inner tubular member 127 with a casing 131 disposed thereabout. The inner tubular member 127 and the casing 131 are preferably made of an organic polymeric or plastic material.

The terminal means 116 includes a strengthening section 117 which is slidably disposed within the conduit 126 and extends from the end of the conduit. The strengthening section 117 extends radially of the core 112 a distance which is equal to or no greater than the outer radial extremities of the coiled wire 114. In other words, the strengthening portion 117 does not extend radially outwardly past the outer extremities of the coiled wire 114 as does the terminal means 16 in the embodiment of FIGS. 1 through 4. The strengthening section 117 is sufficiently rigid or flexible along its longitudinal axis to prevent the end of the motion transmitting element from bending whereby compression forces may be applied to the terminal means 116 to move the motion transmitting element into the conduit 126.

The assembly 110 also includes a fitting member 133 which is adapted to attach or support the conduit 126 upon a support structure.

Turning now to the embodiment shown in FIGS. 7 through 9, there is disclosed a motion transmitting remote control assembly generally at 210. Like the previous assemblies, there is included an elongated flexible motion transmitting element including a multi-stranded core 212 with a helically coiled wire 214 disposed thereabout.

The assembly 210 also includes a terminal means 216 made of organic polymeric or plastic material and disposed about the motion transmitting element.

The assembly also includes a guide means generally indicated at 226 and in which a circular portion 225 of the terminal means slides along. More specifically, the guide means includes a slideway 228 for guiding sliding movement of the terminal means 216 while retaining the terminal means therein.

The assembly 210 is particularly adapted for utilization in a sliding sun roof assembly for an automobile. The terminal 216 supports an arm 250 which is rotatably attached to terminal means 216 by a shaft 252. The sliding roof moves vertically upwardly and then rearwardly to open and conversely moves forwardly and downwardly to close. The member 250 supports a portion of the sliding roof on the pin 254 and the pin 254 rotates between a raised position, shown in full lines in FIG. 8, and a lowered position, shown in phantom in FIG. 8, all this being accomplished as the terminal means 216 is guided and moves along the slideway 228 of the guide 226. A spring 256 urges the member 250 toward the terminal means 216. Thus, a sun roof is moved between vertically spaced planes as the terminal means 216 moves along the guide means 226 and the arm 250 rotates between its horizontal and vertical positions as illustrated in FIG. 8. The front end of the terminal means 216 includes a pointed or tapered nose to facilitate movement of the terminal means along the slideway 228.

The slideway 260 comprises a runout slideway for slidably supporting another motion transmitting element which is disposed in an assembly like the assembly 210 but disposed along the opposite edge or extremity of the sliding roof assembly. The additional channel 262 supports a sliding headliner for sliding movement for and aft of the automobile.

The invention has been described in an illustrative manner, and it is to be understood that the terminology which has been used is intended to be in the nature of words of description rather than of limitation.

Obviously, many modifications and variations in the instant invention are possible in light of the above teachings. It is, therefore, to be understood that the invention may be practiced otherwise than as specifically described and yet remain within the scope of the depending claims.

The embodiments of the instant invention in which an exclusive property or privilege is claimed are defined as follows:

1. A motion transmitting remote control assembly comprising: an elongated flexible motion transmitting element including a solid core made up of a plurality of individual wire strands helically wound together on a long lead and a helically coiled wire disposed in direct engagement about said core in spaced convolutions, terminal means of organic polymeric material which is inflexible in all directions and disposed about said element along a predetermined section of the length thereof to encase said coiled wire and said strands of said core to fill the areas between adjacent convolutions of said wire so that said strands of said core and said coiled wire are embedded in said terminal means, and a guide disposed about said element and said terminal means for supporting said element and said terminal means for longitudinal movement, said terminal means including a strengthening section extending along said predetermined section of said element for preventing the bending of said element along its longitudinal axis along said predetermined section thereof and an attachment portion extending from said guide for connection to a movable member.

2. An assembly as set forth in claim 1 wherein said guide includes an elongated slideway for guiding sliding movement of said terminal means while retaining said terminal means therein.

3. An assembly as set forth in claim 2 wherein said guide includes a channel for guiding sliding movement of a movable member, and a passage between said slideway and said channel, said attachment portion extending through said passage and into said channel for attachment to the movable member.

4. An assembly as set forth in claim 3 wherein said slideway is circular in cross-section.

5. An assembly as set forth in claim 4 wherein said channel is generally U-shaped in cross-section.

6. An assembly as set forth in claim 1 wherein said guide comprises a conduit and said predetermined section of said terminal means extends from the end of said conduit.

7. An assembly as set forth in claim 6 wherein said strengthening section extends radially of said core a distance no greater than the outer radial extremities of said coiled wire.

8. An assembly as set forth in claim 1 wherein said terminal means extends radially of said core a distance greater than the outer extremities of said coiled wire.

* * * * *